Figure 4:
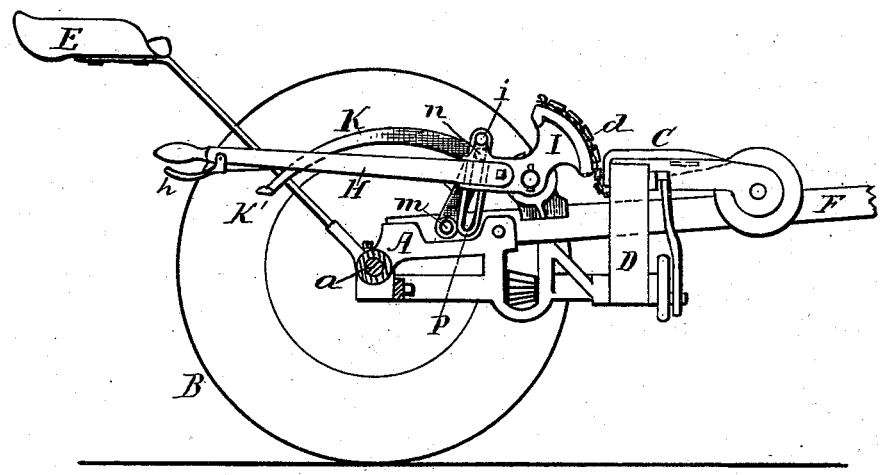

(No Model.) 2 Sheets—Sheet 1.
G. R. PARKER.
BAR LIFTING ATTACHMENT FOR MOWERS
No. 532,091. Patented Jan. 8, 1895.
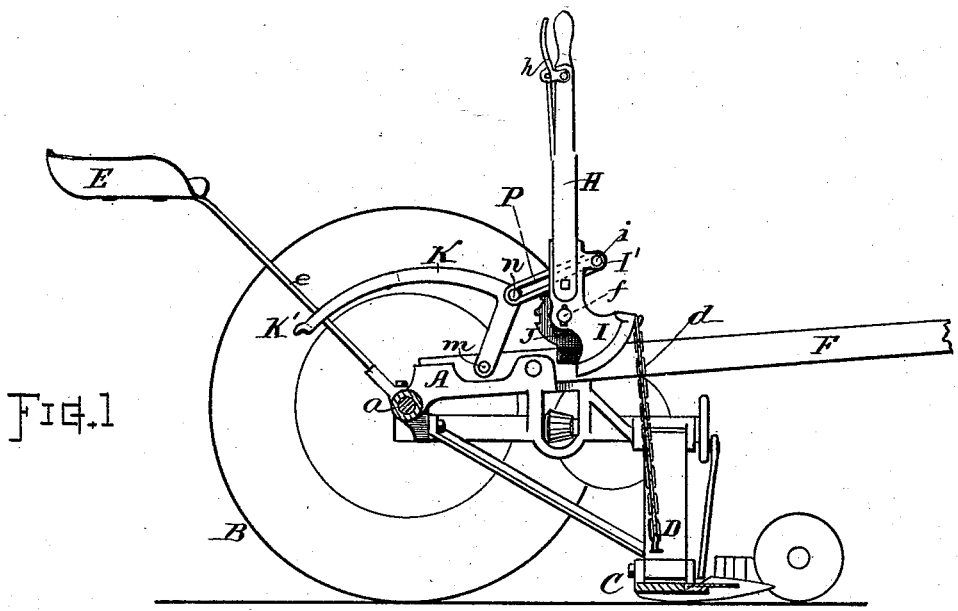
Fig. 1
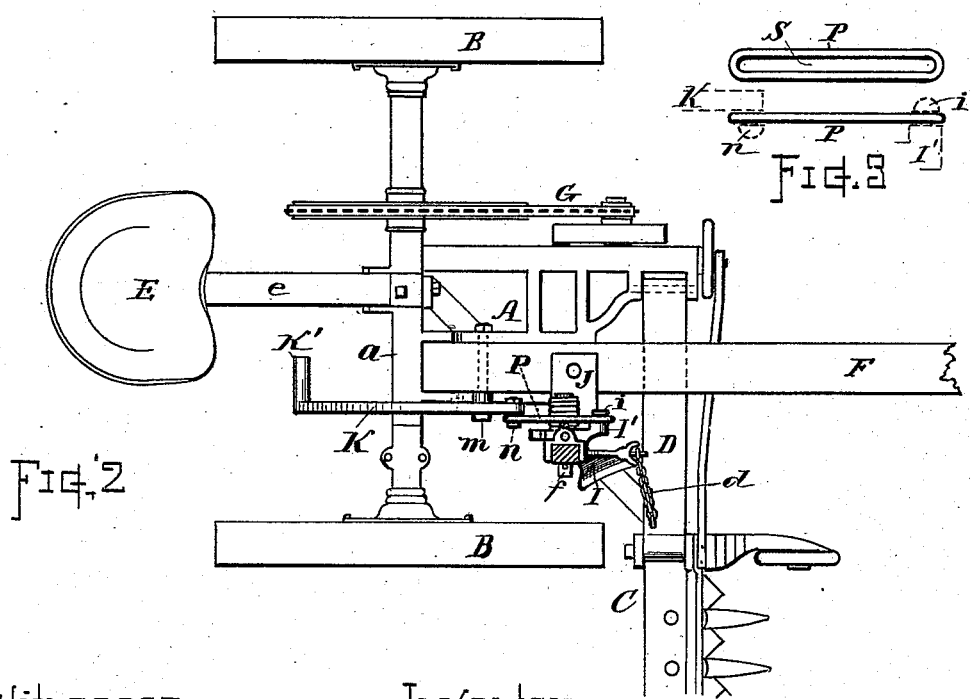
Fig. 2
Fig. 3
Witnesses
Ella P. Blunt
Simeon E. King
Inventor
Gardner R. Parker
By Chas. H. Burleigh
Attorney (No Model.) 2 Sheets—Sheet 2.

G. R. PARKER.
BAR LIFTING ATTACHMENT FOR MOWERS.

No. 532,091. Patented Jan. 8, 1895.

Witnesses
Ella P. Blenus
Simeon E. King

Inventor
Gardner R. Parker
By Chas H. Burleigh
Attorney

UNITED STATES PATENT OFFICE.

GARDNER R. PARKER, OF WORCESTER, MASSACHUSETTS, ASSIGNOR TO THE RICHARDSON MANUFACTURING COMPANY, OF SAME PLACE.

BAR-LIFTING ATTACHMENT FOR MOWERS.

SPECIFICATION forming part of Letters Patent No. 532,091, dated January 8, 1895.

Application filed February 26, 1894. Serial No. 501,475. (No model.)

*To all whom it may concern:*

Be it known that I, GARDNER R. PARKER, a citizen of the United States, residing at Worcester, in the county of Worcester and State of Massachusetts, have invented a new and useful Improvement in Bar-Lifting Attachments for Mowers, of which the following, together with the accompanying drawings, is a specification sufficiently full, clear, and exact to enable persons skilled in the art to which this invention appertains to make and use the same.

My invention relates to that part of the mechanism employed for raising or controlling the finger-bar when passing obstructions, or when turning the machine; the object of the invention being to provide an inexpensive, simple, and efficient foot-lever and coupling appliances adapted for connecting the same with the hand-lever or the lifter-segment, in the peculiar manner explained, for working the finger-bar lift by foot pressure; and my invention consists in the specific mechanism constructed and combined for operation, as hereinafter described.

In the drawings, Figure 1 is a side view of my improved mechanism as applied to a mowing machine. Fig. 2 is a plan view of the same. Fig. 3 shows a side and top view of the connecting link separate from the mechanism, and Fig. 4 is a view of the mechanism in folded or confined position, as for traveling.

My improvement is more especially applicable to that class of mowing machines or harvesters having a front-cut, hinge-jointed finger-bar connected by a lifting chain to a segment lifter with a hand-lever thereon; and provided with a seat supported above and in rear of the main axle in the general manner and arrangement as illustrated. The principal parts of such machine being of well-known construction and operation need not be herein described further than by brief designation to indicate their location, and the general relation thereto of my present improvements, thus:

A denotes the frame of the machine; a, the main axle and its housing; B, the wheels; C, the finger-bar and cutting mechanism; D, the hinging-joint piece that carries the finger-bar; d, the lifting chain attached thereto; E, the driver's seat; e, the seat spring; F, the tongue or pole, and G the operating gearing; said parts being of usual construction. The action of the finger-bar as raised and depressed will be understood.

The lifting mechanism comprises the rocking lifter-segment I to which the chain d' is attached in usual manner; said segment being pivotally mounted on a laterally projecting stud f fixed in the bracket J attached to the machine frame or pole F. The segment I has rigidly fixed thereto the hand-lever H, and is provided with the ratchet devices h, of usual construction, that engage with the notched sector for retaining the parts at certain positions of adjustment when the finger-bar is elevated.

According to my improvement a boss or forwardly projecting ear I is provided at the side of the hand-lever H, preferably integral with the lever socket which is a part of the lifter-segment casting. Said ear is furnished with a laterally projecting headed stud or pin i. When applied to machines previously built the ear I' may be made as a separate piece and be bolted or riveted to the side of the lever or its socket casting. At a position somewhat to the rear of the lifter-segment axis and its supporting bracket J, as shown, I arrange a lever or arm K having its front end pivotally supported by an axis-stud or bolt m in connection with the tongue (or on the frame casting if preferred) and serving as the fulcrum for the lever. From the pivoted end said lever extends upward for some distance and is then bent or turned backward at an angle of about ninety degrees, more or less, and thence extends rearward with a downward curve to a position beyond the main axle a, its rear end being provided with a footpiece K' within convenient reach to be depressed by the foot of the driver. The lever K is provided at or near its angle or top with a laterally projecting headed stud or pin n. The stud n of the foot-lever is coupled with the stud i of the hand-lever H, or ear I' fixed to the segment I, by means of a slotted link P which loosely engages the necks of the studs n and i and confines them within the limit of the link but permits their approach toward each other by sliding within the slot *s*. This slotted connecting link P is free or unattached otherwise than its loose engagement of the studs *i* and *n*, and can assume any position which said studs relatively permit in their planes of action. It thus affords facility for the backward swing of the hand-lever without interference from the foot-lever, and for the swinging back of the segment by means of the foot-lever when desired, without handling the lever H, thus forming a very simple, efficient and inexpensive auxiliary foot-lever attachment for working the lifter-segment I and parts connected therewith.

The loose link P not only permits independent action of the hand lever independent of the foot-lever, but also affords means for holding up the foot lever when traveling to and from work, or driving on the road, with the cutter-bar folded over the machine and the hand lever laid back to horizontal position, as illustrated in Fig. 4. When this position is assumed the stud *i* is brought over the stud *n* and the loose link P can occupy a vertical position, its lower end adjacent to the pivot-stud *m*, in which position the parts form a lock for retaining the foot-lever elevated; so that its rear end K' will not drop below the axle and hang loose or be liable to contact with anything over which the machine may pass. Another advantage of this peculiar form and arrangement of the levers is, a shorter movement of the foot is required for elevating the bar a given distance. Hence, a short-legged man can work the mechanism with great facility and convenience; or, again, by placing the stud *n* at different relation below, at, or back from the angle of the lever K the foot mechanism can be adapted to suit the stature of any person using the machine.

It will be understood that I do not herein make claim broadly to the use of foot-operated devices in connection with hand-operated devices for controlling the finger-bar lifting appliances in a mowing machine or harvester; but my claim has reference to the specific arrangement of mechanism and mode of operation defined.

What I claim, and desire to secure by Letters Patent, is—

1. In a mowing machine having a hinge-jointed finger-bar, a lifting-chain and a rocking lifter-segment for taking up said chain, pivoted upon the forward part of the machine, with a hand-lever attached to said segment; the foot-lever independently fulcrumed on a stationary pivotal axis in rear of the segment axis, said foot-lever formed with an upwardly directed front end, its top turned backward at an angle and extending rearward in a curved arm carrying a foot-piece adapted for swinging downward behind the main axle, as described, laterally projecting studs respectively arranged on said hand-lever and said foot-lever, and a longitudinally-slotted free link embracing within its slot both said studs, thereby coupling said foot-lever, at its angle, with said hand-lever or segment, substantially as and for the purposes set forth.

2. In combination, substantially as described; the rocking lifter-segment provided with the upright hand-lever and having the forward ear with a projecting stud on the side thereof, the foot-lever pivotally fulcrumed at its forward end upon the pole or machine frame in rear of the lifter-segment, said foot-lever extending upward from its fulcrum, its upper portion turned backward, at an angle to extend rearward over the main axle, and carrying a projecting stud at its top or angle, the free longitudinally-slotted link loosely embracing the necks of said projecting studs, thereby coupling said foot-lever with the lifter-segment and hand-lever, and the fulcrum pin or stop, at the side of the pole or frame, projecting across the plane of said link, for the purpose set forth.

Witness my hand this 22d day of February, A. D. 1894.

GARDNER R. PARKER.

Witnesses:
CHAS. H. BURLEIGH,
GEO. M. RICE.